United States Patent [19]
Weder

[11] Patent Number: 5,479,758
[45] Date of Patent: * Jan. 2, 1996

[54] COVERING FOR FLOWER POT AND FLORAL GROUPING

[75] Inventor: Donald E. Weder, Highland, Ill.

[73] Assignee: Highland Supply Corporation, Highland, Ill.

[*] Notice: The portion of the term of this patent subsequent to May 3, 2011, has been disclaimed.

[21] Appl. No.: 183,010

[22] Filed: Jan. 14, 1994

Related U.S. Application Data

[63] Continuation of Ser. No. 1,001, Jan. 6, 1993, Pat. No. 5,307,606, which is a continuation-in-part of Ser. No. 865,563, May 21, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ ............................ B65B 25/02; B65B 43/08; B65B 5/02; B65B 47/00
[52] U.S. Cl. .................................. 53/410; 53/452; 53/456; 53/461
[58] Field of Search ............................. 53/410, 420, 397, 53/399, 452, 453, 456, 461, 464, 469, 390; 206/423; 47/84, 72

[56] References Cited

U.S. PATENT DOCUMENTS

| 2,774,187 | 12/1956 | Smithers | 206/423 X |
|---|---|---|---|
| 2,989,828 | 6/1961 | Warp | 53/390 |
| 3,083,100 | 3/1963 | Baran | 53/456 X |
| 3,431,706 | 3/1969 | Stuck | 53/390 |
| 4,026,458 | 5/1977 | Morris et al. | 53/456 X |
| 4,189,868 | 2/1980 | Tymchuck et al. | 206/423 X |
| 4,333,267 | 6/1982 | Witte | 47/84 |
| 4,733,521 | 3/1988 | Weder et al. | |
| 4,773,182 | 9/1988 | Weder et al. | 47/72 |
| 4,873,814 | 10/1989 | Harris | 53/452 X |
| 5,111,638 | 5/1992 | Weder | 53/397 |
| 5,120,382 | 6/1992 | Weder | 53/397 |
| 5,181,364 | 1/1993 | Weder | 53/397 |

OTHER PUBLICATIONS

"The Simple Solution For Those Peak Volume Periods", Brochure, Highland Supply Corporation, 1989.
"Speed Sheets and Speed Rolls", Brochure, Highland Supply Corporation, 1990.

Primary Examiner—Horace M. Culver
Attorney, Agent, or Firm—Dunlap & Codding

[57] ABSTRACT

A cover for use with a flower pot having a floral grouping disposed therein. The cover includes a sheet of material having a sheet extension connected to an outer peripheral surface thereof. The sheet of material is formed into a pot cover for covering the flower pot and the sheet extension extends over the floral grouping.

21 Claims, 2 Drawing Sheets

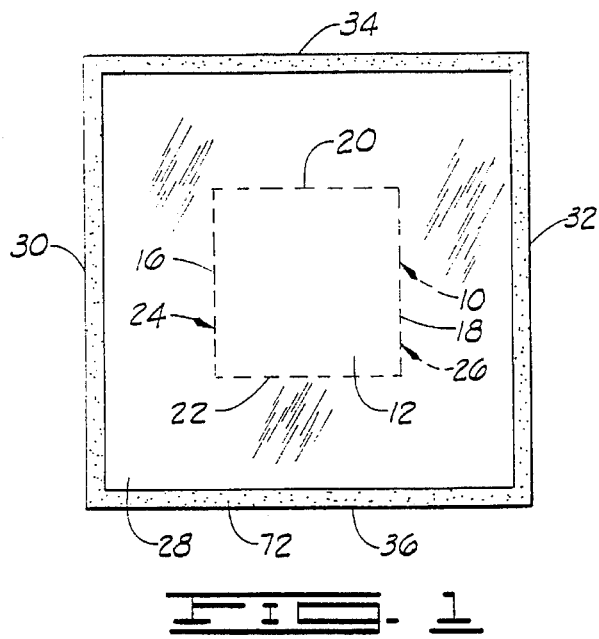
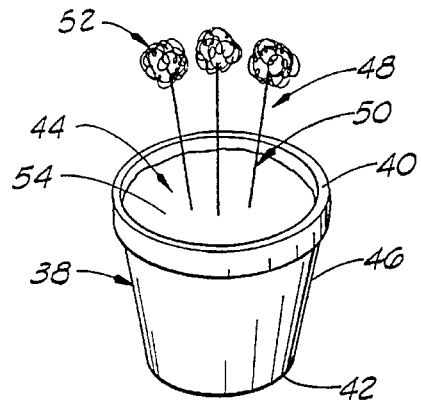
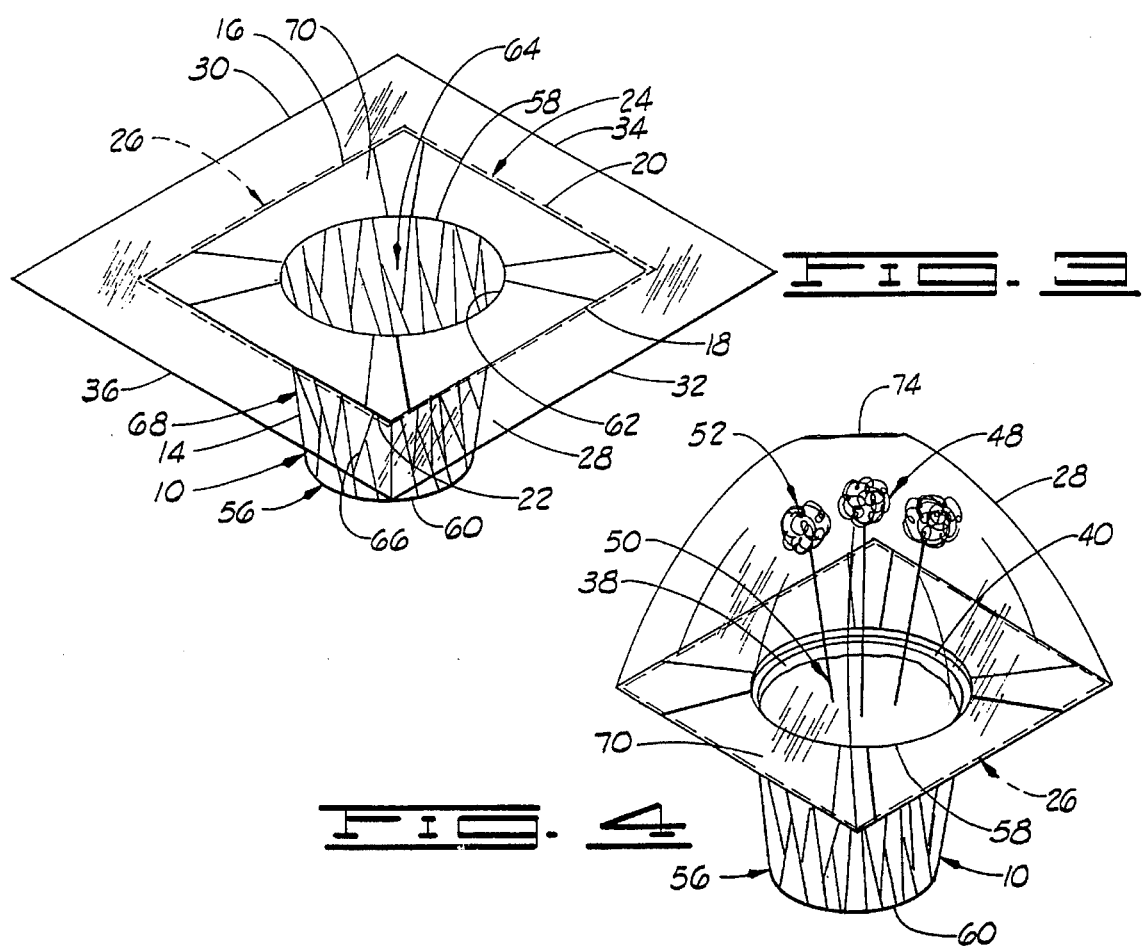

COVERING FOR FLOWER POT AND FLORAL GROUPING

CROSS-RELATED REFERENCES

This invention is a continuation of U.S. Ser. No. 08/001,001 filed Jan. 6, 1993 entitled "COVERING FOR FLOWER POT AND FLORAL GROUPING", now U.S. Pat. No. 5,307,606 which is a continuation-in-part of U.S. Ser. No. 865,563, filed May 21, 1992, entitled, METHOD FOR WRAPPING AN OBJECT WITH A MATERIAL HAVING PRESSURE SENSITIVE ADHESIVE THEREON, now U.S. Pat. No. 5,245,814, which is a continuation of U.S. Ser. No. 649,379, filed Jan. 31, 1991, now U.S. Pat. No. 5,111,638, issued May 12, 1992, entitled, METHOD FOR WRAPPING AN OBJECT WITH A MATERIAL HAVING PRESSURE SENSITIVE ADHESIVE THEREON, which is a continuation of U.S. Ser. No. 249,761, filed Sep. 26, 1988, now abandoned, which is a continuation-in-part of U.S. Ser. No. 219,083, filed Jul. 13, 1988, now U.S. Pat. No. 4,897,031, issued Jan. 30, 1990 which is a continuation of U.S. Ser. No. 004,275, filed Jan. 5, 1987, entitled "ARTICLE FORMING SYSTEM", now U.S. Pat. No. 4,773,182, issued Sep. 27, 1988, which is a continuation of U.S. Ser. No. 613,080, filed May 22, 1984, entitled "ARTICLE FORMING SYSTEM", now abandoned.

FIELD OF THE INVENTION

The present invention relates generally to coverings for flower pots and, more particularly, but not by way of limitation, to a covering for a flower pot having a sheet extension for extending about a floral grouping disposed in the flower pot.

BRIEF DESCRIPTION OF THE DRAWINGS

FIG. 1 is a plan view of a sheet of material with a sheet extension connected thereto constructed in accordance with the present invention.

FIG. 2 is a partial perspective view of a flower pot having a floral grouping disposed therein.

FIG. 3 is a partial perspective view of the sheet of material formed into a pot cover with the sheet extension connected thereto.

FIG. 6 is a partial perspective view of the sheet of material of FIG. 5 formed into the pot cover and having the flower pot of FIG. 2 disposed in the pot cover with the sheet extension formed about the floral grouping.

DESCRIPTION OF THE PREFERRED EMBODIMENTS

Figure 4:
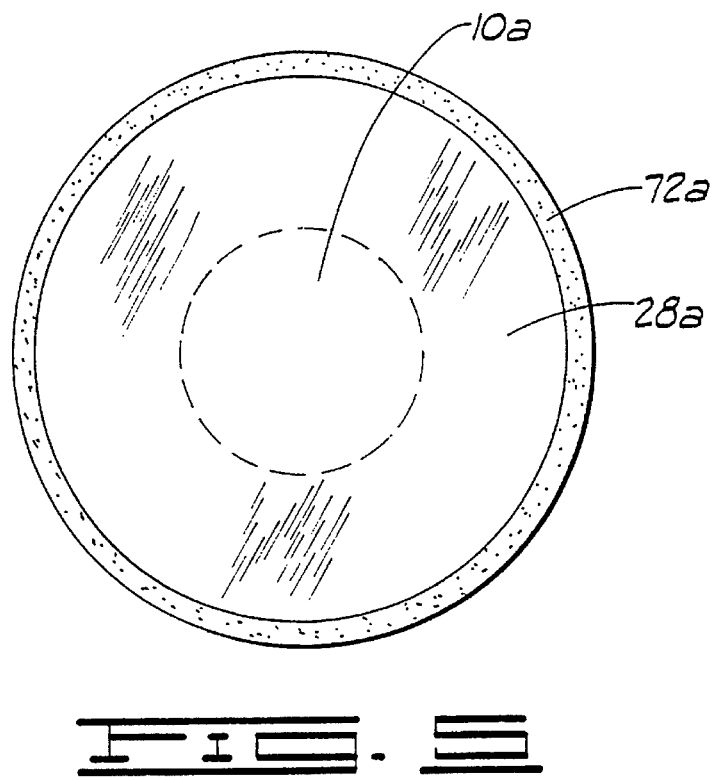
FIG. 4 is a partial perspective view showing the flower pot of FIG. 2 disposed in the pot cover of FIG. 3 with the sheet extension formed about the floral grouping.

Referring to FIG. 1, as shown therein and designated by the general reference numeral 10 is a sheet of material constructed in accordance with the present invention. The sheet of material 10 shown in FIG. 1 has an upper surface 12, a lower surface 14 (FIG. 3), a first end 16, a second end 18, a first side 20 and a second side 22. The ends 16 and 18 cooperate with the sides 20 and 22 to define an outer peripheral surface 24 of the sheet of material 10. The outer peripheral surface 24 of the sheet of material 10 is defined by perforations 26, as shown in FIGS. 1, 3 and 4.

As shown in FIGS. 1, 3 and 4, a sheet extension 28 is connected to the outer peripheral surface 24 of the sheet of material 10. As shown in FIGS. 1 and 3, the sheet extension 28 extends a distance outwardly from the outer peripheral surface 24 of the sheet of material 10. The sheet extension 28 has a first end 30, a second end 32, a first side 34 and a second side 36. A portion of the sheet extension 28 extends a distance outwardly from the first end 16 of the sheet of material 10 terminating with the first end 30 of the sheet extension 28. Another portion of the sheet extension 28 extends a distance outwardly from the second end 18 of the sheet of material 10 terminating with the second end 32 of the sheet extension 28. Yet another portion of the sheet extension 28 extends a distance outwardly from the first side 20 of the sheet of material 10 terminating with the first side 34 of the sheet extension 28. Still another portion of the sheet extension 28 extends a distance outwardly from the second side 22 of the sheet of material 10 terminating with the second side 36 of the sheet extension 28.

The sheet extension 28 cooperates with the sheet of material 10 to define a generally square or rectangularly shaped sheet with the perforations 26 being disposed in a central portion of the sheet and defining the outer peripheral surface 24 of the sheet of material 10. Preferably, the sheet of material 10 and the sheet extension 28 are unitary and formed from a single sheet or plies or multiple sheets one on top of the other which may or may not be laminated.

The sheet of material 10 and the sheet extension 28 are constructed from any suitable flexible material that is capable of being wrapped about a floral grouping and formed into the covering, as described herein. Preferably, the sheet of material 10 and the sheet extension 28 are constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 and the sheet extension 28 have a thickness in a range from about 0.1 mils to about 30 mils. Preferably, the sheet of material 10 and the sheet extension 28 have a thickness in a range from about 0.1 mils to about 5 mils.

The sheet of material 10 and the sheet extension 28 may be any shape and a rectangular shape is shown in FIG. 1 only by way of example. The sheet of material 10 and the sheet extension 28 for example only may be square, rectangular, circular or any other geometric shape such as heart shaped for example only.

The sheet of material 10 and the sheet extension 28 may be constructed of a single layer of material or a plurality of layers of the same or different types of materials. Any thickness of the sheet of material 10 and the sheet extension 28 may be utilized in accordance with the present invention as long as the sheet of material 10 and the sheet extension 28 is wrappable about a floral grouping and formable into the covering, as described herein. The layers of material comprising the sheet of material 10 and the sheet extension 28 may be connected together or laminated or may be separate layers.

The covering of the present invention is particularly constructed to be used with a pot 38 (FIG. 2). The pot 38 has a top 40, a bottom 42 with an opening through the top 40 forming a receiving space 44 within the pot 38. The pot 38 also has an outer peripheral surface 46. As shown in FIG. 2, the pot 38 is generally cylindrically shaped. However, the pot 38 may be any shaped as may be desired in a particular application.

A floral grouping 48 is disposed at least partially within the receiving space of the pot 38, as shown in FIG. 2. The floral grouping 48 has a stemmed end 50 and a bloom end 52. In one embodiment as shown in FIG. 2, material such as soil 54 is disposed in the receiving space 44 and a portion of the stem end 50 extends into the soil 54. The floral grouping extends a distance upwardly from the top 40 of the pot 38 terminating with the bloom end 52.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

A decorative pattern, such as a color and/or an embossed pattern, and/or other decorative surface ornamentation may be applied to the upper surface 12 and/or the lower surface 14 of the sheet of material 10 or portions thereof including, but not limited to printed design, coatings, colors, flocking or metallic finishes. The sheet of material 10 also may be totally or partially clear or tinted transparent material. The sheet extension 28 is transparent, although a decorative pattern also may be applied to the sheet extension 28.

The sheet of material 10 with the sheet extension 28 connected thereto is placed between a male and a female die or other forming means and formed into a pot cover 56 (FIG. 3). As shown in FIGS. 3 and 4, the pot cover 56 has a top 58, a closed bottom 60 and a cover opening 62 (FIG. 3) formed through the top 58 and extending through the top 58 a distance toward the bottom 60 of the pot cover 56 providing a pot receiving space 64 (FIG. 3). The pot receiving space 64 is shaped and adapted to receive the pot 38.

The pot cover 56 has a plurality of overlapping folds 66 (FIG. 3) with each of the overlapping folds 66 extending at various distances and at various angles over an outer peripheral surface 68 (FIG. 3) of the pot cover 56 extending between the top 58 and the bottom 60. The overlapping folds 66 extend at various angles and over various distance over the outer peripheral surface 68.

The pot cover 56 includes a skirt 70 (FIGS. 3 and 4). The skirt 70 extends from the top 40 of the pot 38 radially outwardly with an outer peripheral surface of the skirt 70 being formed by the outer peripheral surface 24 of the sheet of material 10. The perforations 26 extend along the outer peripheral surface of the skirt 70 formed by the outer peripheral surface 24 of the sheet of material 10.

The overlapping folds 66 may be connected or at least partially connected. The connection of the overlapping folds may be accomplished by using heat sealing material and heat sealing the overlapping folds or by adhesively or cohesively connecting the overlapping folds.

A pot cover constructed in the manner just described with respect to the pot cover 56 and a system for forming such a pot cover is disclosed in U.S. Pat. No. 4,773,182, entitled, Article Forming System, issued to Weder, et al, Sep. 27, 1988, and the disclosure of this patent specifically hereby is incorporated herein by reference.

The pot 38 is placed in the pot receiving space 64 and positioned in the pot cover 56 such that the bottom 42 of the pot 38 is disposed generally adjacent the bottom 60 of the pot cover 56. The pot cover 56 substantially encompasses the entire outer peripheral surface 46 of the pot 38 including the bottom 42. The pot cover 56 extends from the bottom 42 to the top 40 of the pot 38. The skirt 70 extends radially outwardly from the top 40 of the pot 38.

After the pot 38 has been placed in the pot cover 56, the skirt extension 28 is formed about the floral grouping 48 to a position wherein the sheet extension 28 covers and encompasses a substantial portion of the floral grouping including the bloom end of the floral grouping.

The sheet extension 28 preferably includes a bonding material 72 (FIG. 1) disposed on the upper surface of the sheet extension 28 and extending about the outer peripheral surface of the sheet extension 28. After the sheet extension 28 has been formed about the floral grouping 48, the ends of the sheet of material are bonded together to provide a closed end 74 (FIG. 4).

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein. The term "bonding material" also includes labels, bands, ribbons, strings, tape, staples or combinations thereof.

The sheet extension 28 remains in a position extending about the floral grouping 48 until it is desired to remove the sheet extension 28. The sheet extension 28 is removed from the pot cover 56 by tearing along the perforations 26 separating the sheet extension 28 from the pot cover 56. The sheet extension 28 then is removed from the floral grouping 48 leaving the pot cover 56 providing a decorative cover for the pot 38.

In addition to the perforations 26, the sheet extension 28 also may include perforations extending between the perforations 26 and the outer peripheral surface of the sheet extension 28 to further assist in the removal of the sheet extension 28 when it is no longer is desired to keep the sheet extension 28 extending about the floral grouping 48.

EMBODIMENT OF FIGS. 5 AND 6

Figure 5:
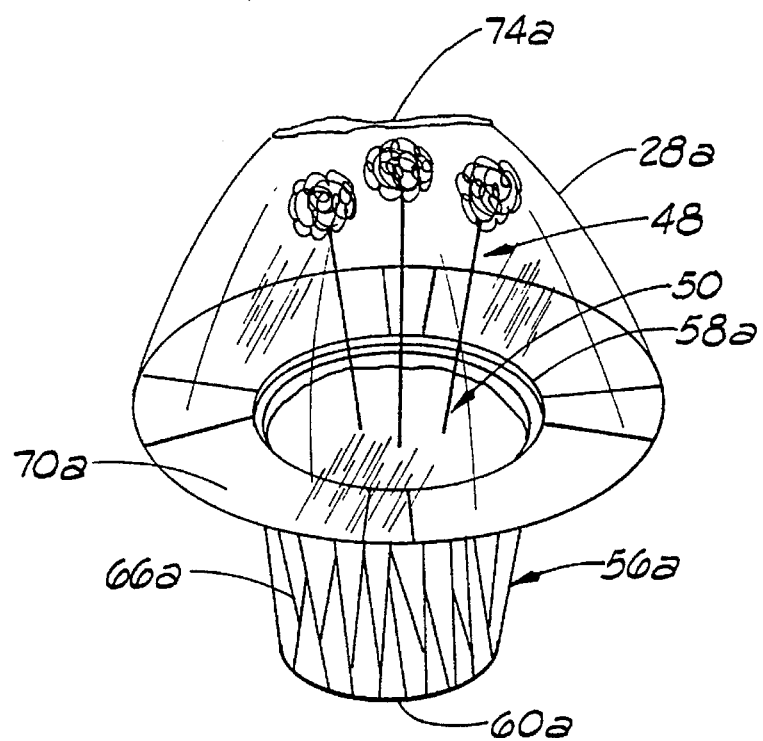
FIG. 5 is plan view of a modified sheet of material with a modified sheet extension connected thereto.

Shown in FIGS. 5 and 6 is a sheet of material 10a having a sheet extension 28a connected thereto. The sheet of material 10a and the sheet extension 28a are constructed exactly like the sheet of material 10 and the sheet extension 28 shown in FIGS. 1, 3 and 4 and described in detail before, except the sheet of material 10a is circularly shaped having a circularly shaped outer peripheral surface 24a and the sheet extension 28a is circularly shaped having a circularly shaped outer peripheral surface.

The sheet of material 10a is formed into a pot cover 56a (FIG. 6) in a manner exactly like that described before with respect to the pot cover 56 (FIGS. 3 and 4), except the pot cover 56a has a skirt 70 with a circularly shaped appearance and a circularly shaped outer peripheral surface defined by the circularly shaped outer peripheral surface 24a of the sheet of material 10a. The sheet extension 28a extends a distance outwardly from the skirt 70a and also has a circularly shaped outer peripheral surface, as mentioned before.

The sheet extension 28a is formed about the floral grouping 48 in a manner like that described before and secured to provide the closed end 74a.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a covering for use with a pot having a floral grouping disposed therein, the pot having a top and a bottom and an outer peripheral surface, and the floral grouping having a stem end and a bloom end with the floral grouping extending a distance upwardly from the top of the pot terminating with the bloom end, the method comprising:

providing a sheet of material having an upper surface, a lower surface and an outer peripheral surface, a sheet extension being connected to the sheet of material and the sheet extension extending a distance from the outer peripheral surface of the sheet of material;

forming the sheet of material into a pot cover having a top, a bottom and a cover opening extending through the top a distance toward the bottom of the pot cover providing a pot receiving space shaped and adapted to receive the pot, the sheet extension extending a distance from the pot cover;

placing the pot in the pot cover with the top of the pot being disposed in the top of the pot cover and the floral grouping extending a distance upwardly from the top of the pot cover; and forming the sheet extension about the floral grouping.

2. The method of claim i wherein the step of forming the sheet of material into the pot cover is defined further as forming the sheet of material into the pot cover having a skirt connected to the top of the pot cover and extending a distance outwardly from the top of the pot cover, the sheet extension extending outwardly from the skirt.

3. The method of claim 1 wherein the step of providing the sheet of material and the sheet extension is defined further as providing the sheet extension with a bonding material disposed thereon, and wherein the step of forming the sheet extension about the floral grouping is defined further as forming the sheet extension about the floral grouping with the sheet extension covering the substantial portion of the floral grouping including the bloom end of the floral grouping and portions of the sheet of material being connected via the bonding material to provide a closed end on the sheet extension with the closed end being disposed above the bloom end of the floral grouping.

4. The method of claim 1 further comprising:

removing the sheet extension from the sheet of material thereby leaving the pot cover.

5. A method for providing a covering comprising:

providing a pot having a floral grouping disposed therein, the pot having a top and a bottom and an outer peripheral surface, and the floral grouping having a stem end and a bloom end with the floral grouping extending a distance upwardly from the top of the pot terminating with the bloom end;

providing a sheet of material having an upper surface, a lower surface and an outer peripheral surface, a sheet extension being connected to the sheet of material and the sheet extension extending a distance from the outer peripheral surface of the sheet of material;

forming the sheet of material into a pot cover having a top, a bottom and a cover opening extending through the top a distance toward the bottom of the pot cover providing a pot receiving space shaped and adapted to receive the pot, the sheet extension extending a distance from the top of the pot cover;

placing the pot in the pot cover with the top of the pot being disposed in the top of the pot cover and the floral grouping extending a distance upwardly from the top of the pot cover; and forming the sheet extension about the floral grouping.

6. The method of claim 5 wherein the step of forming the sheet of material into the pot cover is defined further as forming the sheet of material into the pot cover having a skirt connected to the top of the pot cover and extending a distance outwardly from the top of the pot cover, the sheet extension extending outwardly from the skirt.

7. The method of claim 5 wherein the step of providing the sheet of material and the sheet extension is defined further as providing the sheet extension with a bonding material disposed thereon, and wherein the step of forming the sheet extension about the floral grouping is defined further as forming the sheet extension about the floral grouping with the sheet extension covering a substantial portion of the floral grouping including the bloom end of the floral grouping and portions of the sheet of material being connected via the bonding material to provide a closed end on the sheet extension with the closed end being disposed above the bloom end of the floral grouping.

8. The method of claim 5 further comprising:

removing the sheet extension from the sheet of material thereby leaving the pot cover.

9. A method for providing a covering for use with a pot having a floral grouping disposed therein, the pot having a top and a bottom and an outer peripheral surface, and the floral grouping having a stem end and a bloom end with the floral grouping extending a distance upwardly from the top of the pot terminating with the bloom end, the method comprising:

providing a sheet of material having an upper surface, a lower surface and an outer peripheral surface, a sheet extension being connected to the sheet of material and the sheet extension extending a distance from the outer peripheral surface of the sheet of material;

forming the sheet of material into a pot cover having a top, a bottom and a cover opening extending through the top a distance toward the bottom of the pot cover providing a pot receiving space shaped and adapted to receive the pot, the pot cover having a skirt connected to the top of the pot cover and extending a distance outwardly from the top of the pot cover with the sheet extension extending a distance outwardly from the skirt;

placing the pot in the pot cover with the top of the pot being disposed in the top of the pot cover and the floral grouping extending a distance upwardly from the top of the pot cover; and forming the sheet extension about the floral grouping.

10. A method for providing a cover comprising:

providing a pot having a floral grouping disposed therein, the pot having a top and a bottom and an outer peripheral surface, and the floral grouping having a stem end and a bloom end with the floral grouping extending a distance upwardly from the top of the pot terminating with the bloom end;

providing a sheet of material having an upper surface, a lower surface and an outer peripheral surface, a sheet extension being connected to the sheet of material and the sheet extension extending a distance from the outer peripheral surface of the sheet of material;

forming the sheet of material into a pot cover having a top, a bottom and a cover opening extending through the top a distance toward the bottom of the pot cover providing a pot receiving space shaped and adapted to receive the pot, the pot cover having a skirt connected to the top of the pot cover and extending a distance outwardly from the top of the pot cover and a sheet extension extending a distance from the skirt;

placing the pot in the pot cover with the top of the pot being disposed in the top of the pot cover and the floral grouping extending a distance upwardly from the top of the pot cover; and forming the sheet extension about the floral grouping.

11. A method for covering a pot having a floral grouping disposed therein, the pot having a top and a bottom and an outer peripheral surface, and the floral grouping having a stem end and a bloom end with the floral grouping extending a distance upwardly from the top of the pot terminating with the bloom end, the method comprising:

providing a pot cover having a top, a bottom, an outer peripheral surface, a cover opening extending through the top a distance toward the bottom of the pot cover providing a pot receiving space shaped and adapted to receive the pot and a sheet extension, the sheet extension extending a distance from the top of the pot cover;

placing the pot in the pot cover with the top of the pot being disposed in the top of the pot cover and the floral grouping extending a distance upwardly from the top of the pot cover; and forming the sheet extension about the floral grouping.

12. The method of claim 11 wherein the step of providing the pot cover is defined further as providing a pot cover having a skirt connected to the top of the pot cover and extending a distance outwardly from the top of the pot cover, the sheet extension extending outwardly from the skirt.

13. The method of claim 11 wherein in the step of providing the pot cover, the sheet extension is defined further as having a bonding material disposed thereon, and wherein the step of forming the sheet extension about the floral grouping is defined further as forming the sheet extension about the floral grouping with the sheet extension covering a substantial portion of the floral grouping including the bloom end of the floral grouping and portions of the sheet extension being connected via the bonding material to provide a closed end on the sheet extension with the closed end being disposed above the bloom end of the floral grouping.

14. The method of claim 11 wherein in the step of providing a pot cover with the sheet extension connected thereto, the sheet extension has perforations extending between the pot cover and the sheet extension, and wherein the method further comprises:

tearing the sheet extension along the line of perforations to remove the sheet extension from the pot cover.

15. A method for providing a covering comprising:

providing a pot having a floral grouping disposed therein, the pot having a top, and a bottom and an outer peripheral surface, and the floral grouping having a stem end and a bloom end with the floral grouping extending a distance upwardly from the top of the pot terminating with the bloom end;

providing a pot cover having a top, a closed bottom, a cover opening extending through the top a distance toward the bottom of the pot cover providing a pot receiving space shaped and adapted to receive the pot, and a sheet extension, the sheet extension extending a distance from the top of the pot cover;

placing the pot in the pot cover with the top of the pot being disposed in the top of the pot cover and the floral grouping extending a distance upwardly from the top of the pot cover; and forming the sheet extension about the floral grouping.

16. The method of claim 15 wherein the step of providing the pot cover is defined further as providing a pot cover having a skirt connected to the top of the pot cover and extending a distance outwardly from the top of the pot cover, the sheet extension extending outwardly from the skirt.

17. The method of claim 15 wherein in the step of providing the pot cover the sheet extension is defined further as having a bonding material disposed thereon, and wherein the step of forming the sheet extension about the floral grouping is defined further as forming the sheet extension about the floral grouping with the sheet extension covering a substantial portion of the floral grouping including the bloom end of the floral grouping and portions of the sheet extension being connected via the bonding material to provide a closed end on the sheet extension with the closed end being disposed above the bloom end of the floral grouping.

18. The method of claim 15 wherein in the step of providing a pot cover with the sheet extension connected thereto, the sheet extension has perforations extending between the pot cover and the sheet extension, and wherein the method further comprises:

tearing the sheet extension along the line of perforations to remove the sheet extension from the pot cover.

19. A method for covering a pot having a floral grouping disposed therein, the pot having a top and a bottom and an outer peripheral surface, and the floral grouping having a stem end and a bloom end with the floral grouping extending a distance upwardly from the top of the pot terminating with the bloom end, the method comprising:

providing a pot cover having a top, a bottom, a cover opening extending through the top a distance toward the bottom of the pot cover providing a pot receiving space shaped and adapted to receive the pot, a skirt connected to the top and extending a distance outwardly from the top, and a sheet extension connected to the skirt and extending a distance beyond the skirt;

placing the pot in the pot cover with the top of the pot being disposed in the top of the pot cover and the floral grouping extending a distance upwardly from the top of the pot cover; and forming the sheet extension about the floral grouping.

20. A method for providing a cover comprising:

providing a pot having a floral grouping disposed therein, the pot having a top, a bottom and an outer peripheral surface, and the floral grouping having a stem end and a bloom end with the floral grouping extending a distance upwardly from the top of the pot terminating with the bloom end;

providing a pot cover having a top, a bottom, a cover opening extending through the top a distance toward the bottom of the pot cover providing a pot receiving space shaped and adapted to receive the pot, a skirt connected to the top and extending a distance outwardly from the top and a sheet extension connected to the skirt and extending a distance beyond the skirt;

placing the pot in the pot cover with the top of the pot being disposed in the top of the pot cover and the floral grouping extending a distance upwardly from the top of the pot cover; and forming the sheet extension about the floral grouping.

21. A method for providing a covering for use with a pot having a floral grouping disposed therein, the pot having a top and a bottom and an outer peripheral surface, and the floral grouping having a stem end and a bloom end with the floral grouping extending a distance upwardly from the top of the pot terminating with the bloom end, the method comprising:

providing a sheet of material having an upper surface, a lower surface and an outer peripheral surface, a sheet extension being connected to the sheet of material and the sheet extension extending a distance from the outer peripheral surface of the sheet of material;

forming the sheet of material into a pot cover having a top, a bottom and a cover opening extending through the top a distance toward the bottom of the pot cover providing a pot receiving space shaped and adapted to receive the pot;

placing the pot in the pot cover with the top of the pot being disposed in the top of the pot cover and the floral grouping extending a distance upwardly from the top of the pot cover; and forming the sheet extension about the floral grouping.

* * * * *

UNITED STATES PATENT AND TRADEMARK OFFICE
CERTIFICATE OF CORRECTION

PATENT NO. : 5,479,758
DATED : January 2, 1996
INVENTOR(S) : Weder

It is certified that error appears in the above-identified patent and that said Letters Patent is hereby corrected as shown below:

Column 2, line 63, please delete "is" and substitute therefor --are--.

Column 3, line 7, please delete "shaped" and substitute therefor --shape--.

Column 3, line 47, please delete "distance" and substitute therefor --distances--.

Column 4, line 10, please delete "skirt extension 28" and substitute therefor --sheet extension 28--.

Column 4, line 53, after "longer" please delete "is".

Column 5, line 4, please delete "skirt 70" and substitute therefor --skirt 70a--.

Column 5, line 42, please delete "claim i" and substitute therefor --claim 1--.

Signed and Sealed this

Fourteenth Day of May, 1996

Attest:

BRUCE LEHMAN

*Attesting Officer*     *Commissioner of Patents and Trademarks*